Figure 1:
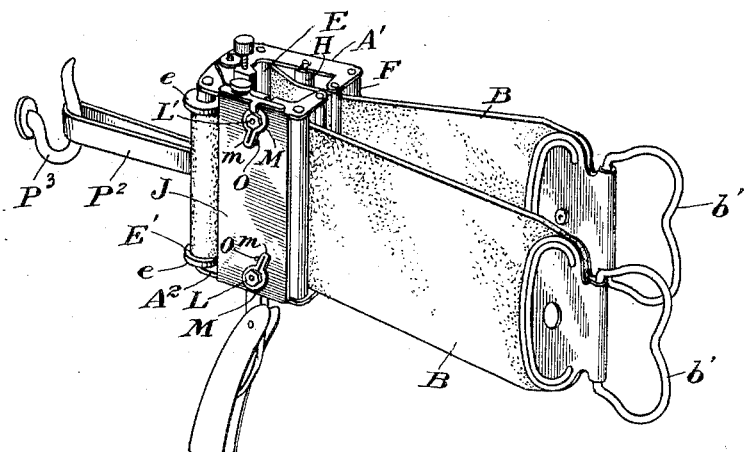

L. A. FLINKER.
HONING AND STROPPING MACHINE.
APPLICATION FILED AUG. 31, 1910.

1,081,285.

Patented Dec. 9, 1913.
5 SHEETS—SHEET 1.

Witnesses:
Robert Head
M. E. Freeman

Inventor:
Leon A. Flinker,
By his Attorneys,
Griffin Bernhard

L. A. FLINKER.
HONING AND STROPPING MACHINE.
APPLICATION FILED AUG. 31, 1910.

1,081,285.

Patented Dec. 9, 1913.
5 SHEETS—SHEET 2.

WITNESSES
Robert Head
M. E. Freeman

INVENTOR
Leon A. Flinker
BY
Griffin Burchard
ATTORNEYS

L. A. FLINKER.
HONING AND STROPPING MACHINE.
APPLICATION FILED AUG. 31, 1910.

1,081,285.

Patented Dec. 9, 1913.
5 SHEETS—SHEET 3.

WITNESSES
Robert Head
M. E. Freeman.

INVENTOR
Leon A. Flinker
BY Griffin & Bernhard
ATTORNEYS

L. A. FLINKER.
HONING AND STROPPING MACHINE.
APPLICATION FILED AUG. 31, 1910.

1,081,285.

Patented Dec. 9, 1913.
5 SHEETS—SHEET 4.

WITNESSES
Robert Head
M. E. Freeman.

INVENTOR
Leon A. Flinker
BY Griffin Burnhard
ATTORNEYS

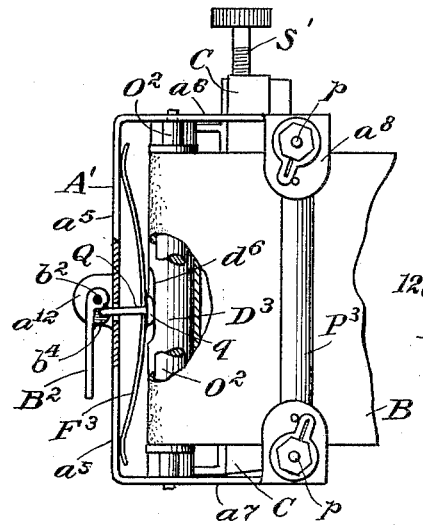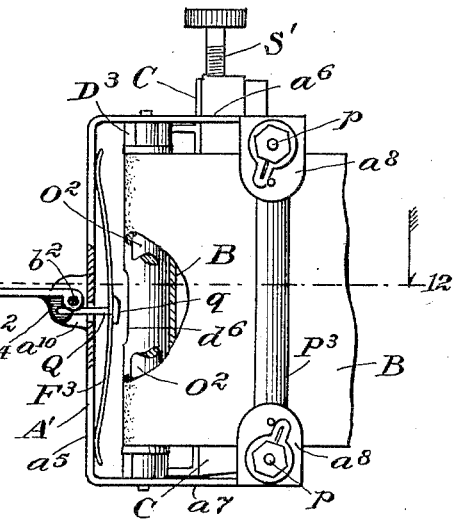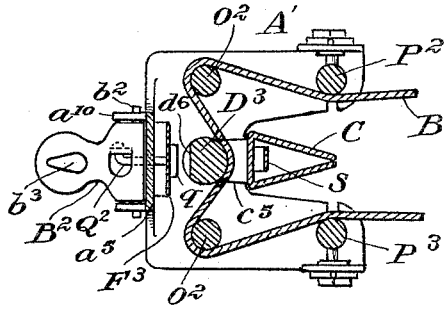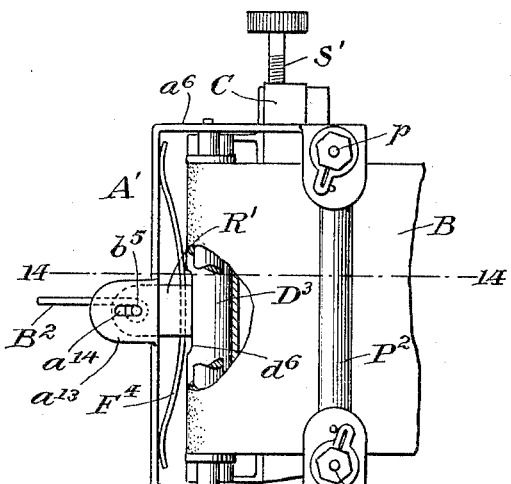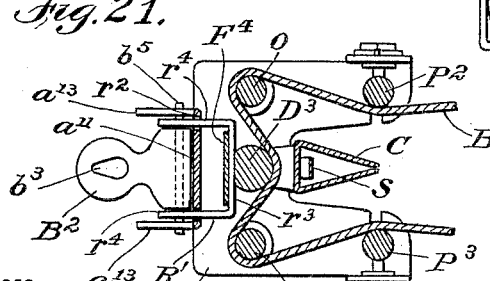

UNITED STATES PATENT OFFICE.

LEON A. FLINKER, OF DETROIT, MICHIGAN, ASSIGNOR TO THE KEENOH COMPANY, OF DETROIT, MICHIGAN, A CORPORATION OF MICHIGAN.

HONING AND STROPPING MACHINE.

1,081,285.   Specification of Letters Patent.   Patented Dec. 9, 1913.

Application filed August 31, 1910.  Serial No. 579,920.

*To all whom it may concern:*

Be it known that I, LEON A. FLINKER, a citizen of the United States, residing in the city of Detroit, county of Wayne, and State of Michigan, have invented a certain new and useful Honing and Stropping Machine, of which the following is a specification.

This invention is a machine particularly adapted for sharpening razor blades of all types, and embodies means for both honing and stropping such blades.

This invention is a machine of that type wherein a blade holder when at rest is retained in a position substantially midway between the leads of a running strop, whereby a razor or other blade may be inserted into, or withdrawn from, said blade holder in a manner to avoid cutting the strop or the hands of the operator.

The device or machine embodies means whereby the strop may be presented at different inclinations or angles to the sides of the razor blade to be sharpened, thereby varying the effective action of the strop, and permitting the blade to be subjected to either a honing or a stropping action; means for indicating the relative adjustment of parts when the device is used for honing or stropping, respectively, and guiding devices, such as rollers, provided with suitable flanges whereby the edges of the strop are protected against wear and abrasion.

An important result secured by one of my improvements consists in a change in the angle of presentation of the strop to the side face of the blade, according as it is desired to hone the blade or to strop it. In carrying out this part of the invention, I employ certain guides for directing the strop, said guides being positioned opposite to the side of the razor adapted to be carried in a blade-holder. The guides are adjustable toward or from the blade-holder. When it is desired to hone the blade, the guides are moved outwardly or separated so that the strop will operate on the sides of the blade and more toward the extreme edge thereof. For stropping the blade, the guides are adjusted inwardly, or toward the hollow sides of the blade, so as to increase the bevels on the respective faces of the blade. By adjusting the rolls, the angle of inclination of the strop relative to the sides of the blade may be varied to secure either of the results desired.

For certain purposes, it is preferred to use a specially prepared strop, as when honing the blade.

Other features of the invention, in addition to those specified, will be apparent from the annexed detailed description and the drawings accompanying the same.

In the drawings I have illustrated different practical embodiments of the invention, but the constructions shown are to be understood as illustrative, only, and not as defining the limits of the invention.

Figure 2:
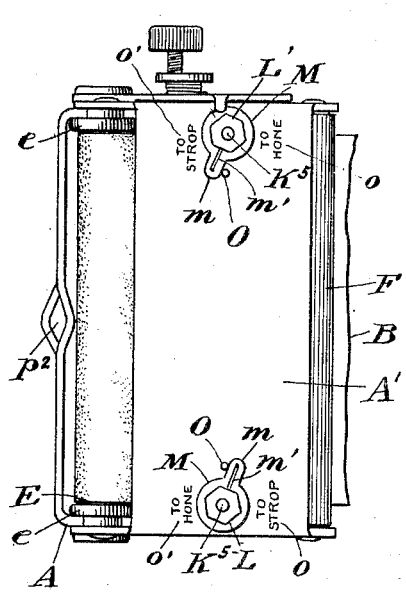
Figure 3:
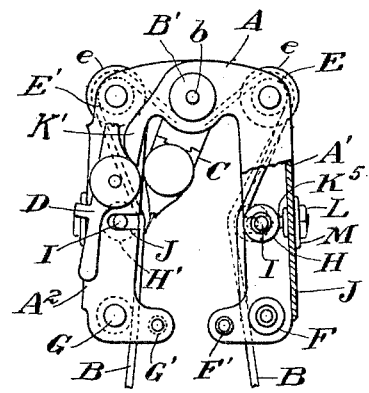
Figure 4:
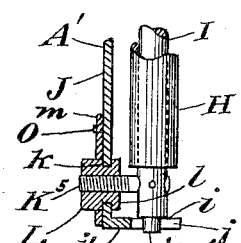
Figure 5:
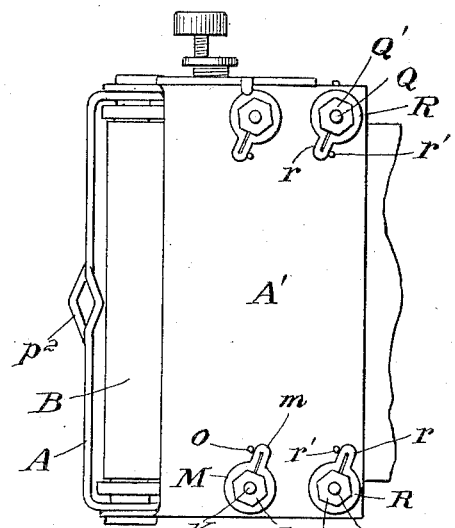
Figure 7:
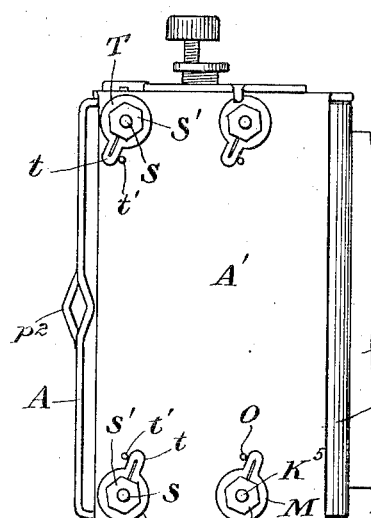
Figure 8:
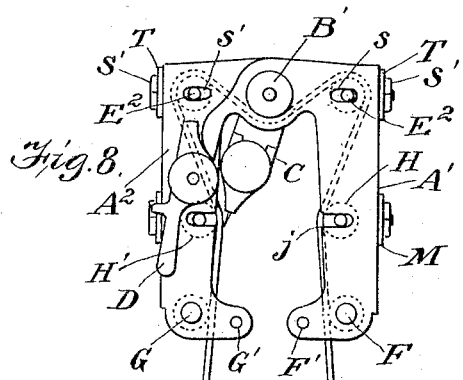
Figure 9:
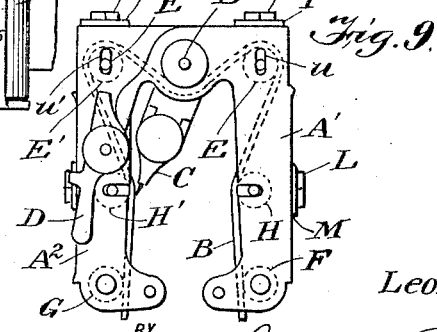
Figure 10:
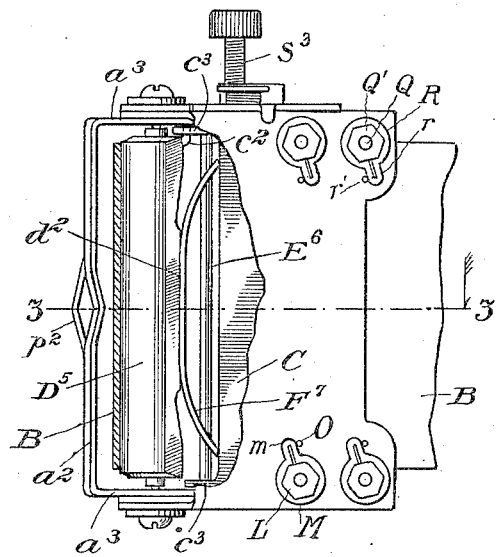
Figure 11:
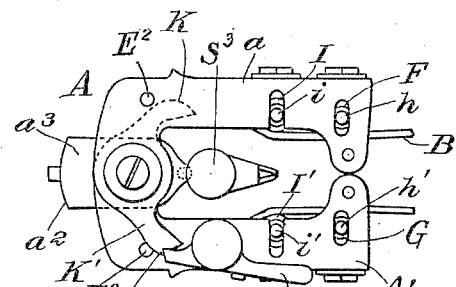
Figure 12:
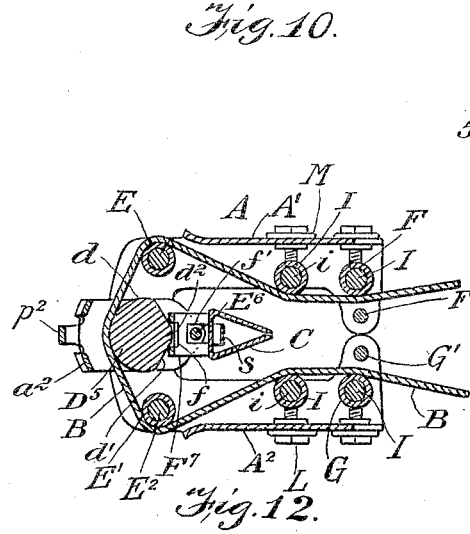
Figure 13:
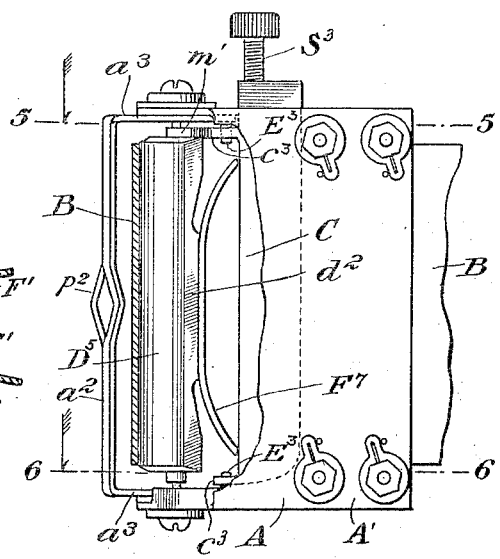
Figure 14:
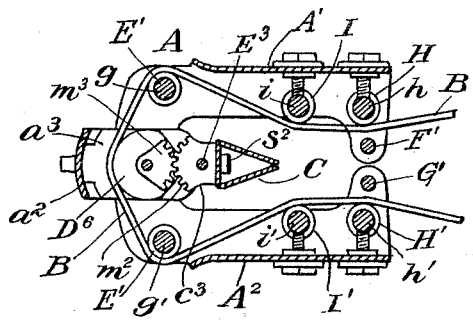
Figure 15:
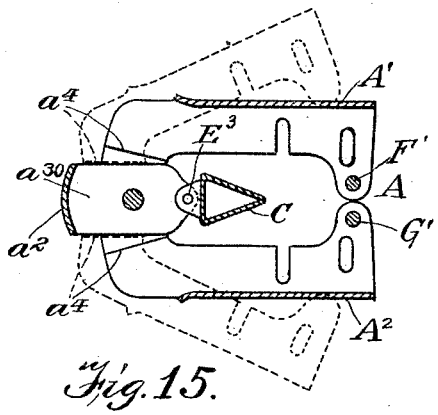
Figure 16:
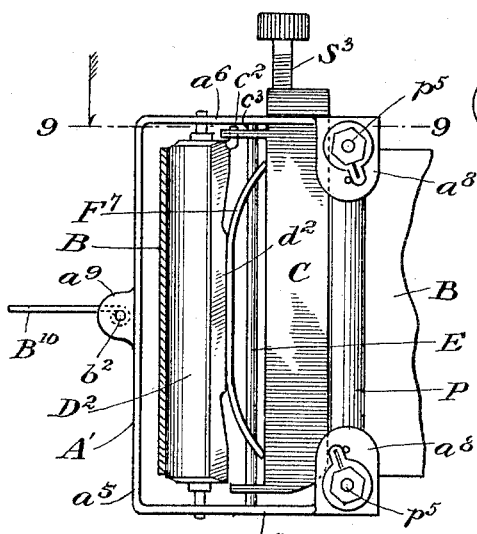
Figure 17:
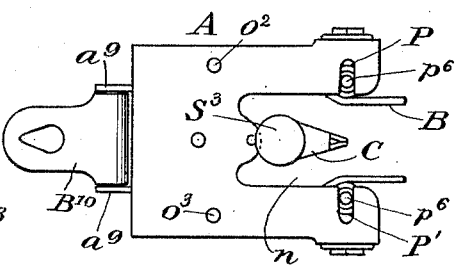
Figure 18:
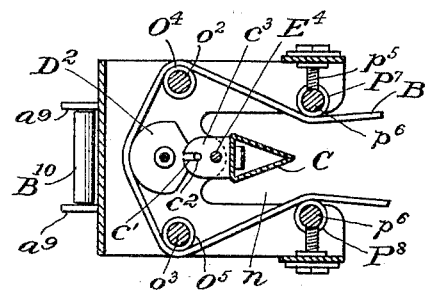

Figure 1 is a perspective view of a honing and stropping machine constructed in accordance with one form of my invention. Fig. 2 is a side elevation illustrating the adjusting and indicating means whereby the position of certain strop guides relative to the edge of a blade to be carried in the blade holder may be adjusted for changing the angle of the strop relative to said edge of the blade. Fig. 3 is an end elevation of the machine. Fig. 4 is a horizontal section, partly in plan, illustrating one form of means for adjusting a certain strop guide and for indicating the position of said guide. Fig. 5 is a side view, and Fig. 6 an end view, of another embodiment of the invention wherein four of the six strop guides employed may be adjusted for varying the inclination of the strop, the positions of said four guides being indicated by my new devices. Figs. 7 and 8 are, respectively, a side view and an end view of another form of construction wherein all of the six rolls are adjustable, and Fig. 9 is an end view of another form of construction wherein the end rolls are adjustable in a different direction relative to the member which actuates the blade holder. Fig. 10 is a side elevation, partly broken away and in section, showing a stropping machine embodying the means for adjusting the blade holder. Fig. 11 is an end view on the device shown in Fig. 10. Fig. 12 is a section of the line 3—3 of Fig. 10. Fig. 13 is a side view partly broken away and in section, illustrating another embodiment of blade holder mechanism. Figs. 14 and 15 are cross sections, partly in elevation, taken in the planes indicated by the dotted lines 5—5 and 6—6, respectively, of Fig. 13 looking in the direction indicated by the arrows. Fig. 16 is a side view, partly broken away and in section, illustrating another construction embodying the blade holder mechanism. Fig. 17 is an end view of the device shown in Fig. 16. Fig. 18 is a sectional view partly in elevation, the plane of the section being indicated by the line 9—9 of Fig. 16. Fig. 19 is a side elevation, partly broken away and in section, illustrating another embodiment of the blade holder mechanism, the locking member being shown in a position for restraining the strop operated member from movement. Fig. 20 is a view corresponding to Fig. 19 with the locking member free from the strop actuated member. Fig. 21 is a cross section on the line 12—12 of Fig. 20. Fig. 22 is a side view, partly in section, showing another embodiment of locking means for the strop actuated member, and Fig. 23 is a section on the line 14—14 of Fig. 22.

The machine shown in Figs. 1 to 4, inclusive, of the drawings consists of a suitable supporting frame, A, a strop, B, and a blade holder, C. As shown, frame, A, consists of members, A', A², pivotally connected together by a shaft, b, carrying a strop-actuated member, B', employed for imparting movement to blade holder, C, whereby the respective sides of the frame may be opened or spread for the purpose of exposing the blade holder, so that a razor blade may be easily introduced into said blade holder or withdrawn therefrom. Member, A', of the frame is shown as having locking arm, K', adapted for engagement by a latch, D, whereby the sides, A', A², may be locked rigidly with relation to each other, and blade holder, C, may be held immovably in position with reference to the sides of the frame, when said frame is opened, as described. In the operative closed position of the frame, however, latch, D, is turned to the position of Figs. 3, 6 and 9, so that the members, A', A², may be closed toward each other, such closed position of the frame being shown more clearly in Figs. 1, 3, 6 and 9. The form of the frame is not an essential part of this invention, for the reason that I may employ a frame, all the parts of which are rigid or integral with each other. The machine herein shown embodies a series of six main guides for the running strop, said guides consisting, preferably, of rollers. The number of guides, however, is not a material part of the invention, for the reason that I may employ four guides. As shown, two guide rollers, E, E', are mounted for free rotation in the members, A', A², respectively, of the supporting frame, said guide rollers being positioned at the respective sides of pivot b. According to this invention, I prefer to provide each roller, E, E', with flanges, e, see Figs. 1 and 2. Said flanges are positioned near the ends of each roller so as to lie next to the supporting frame, and these flanges preclude the edges of the strop, B, from rubbing against the frame, whereby wear and abrasion on the edges of the strop are precluded. As shown, the supporting frame carries certain other guides, F, F', and G, G'. The guides, F, G, are preferably, in the form of rollers and they are positioned at the free or unconnected end portions of the frame members, A', A², whereas the guides, F', G', are shown as pins attached to the unconnected ends of the frame members, A', A². Obviously, however, guides, F and G, may be in the form of pins, and guides, F' and G', in the form of rollers, but each pair of guides, F, F', and G, G', should be properly spaced for the leads of the strop to run between the guides of the respective pairs. H, H', designate other guides which are supported on the respective members, A', A², substantially opposite to the edge of a blade adapted to be supported in blade holder, C. Guide, H, is shown as a roller which is positioned intermediate the roller, E, and the guide, F, of member, A'. Similarly, the other guide, H', is a roller positioned intermediate roller, E', and guide, G, of member, A². The guides, H, H', intermediate the guides, E, F, and E', F', are so positioned that the strop, B, will be presented at a proper angle to the edge of the blade in holder, C. For honing purposes, the angle of the strop to the face of the blade should be different from the angle presented to the blade when stropping it. Accordingly, provision is made for adjusting certain of the rollers to regulate the angle of presentation of the strop to the blade. In the form of machine shown in Figs. 1, 2 and 3, rollers, H, H', are so supported that they may be adjusted relative to the respective members, A', A², of the frame and to the position of the blade in holder, C. Such adjustment of each roller (H, H') is secured by appropriate devices, one form of which is shown in Fig. 4. In this connection, it is desired to state that the position of the adjusting devices and of the rollers, H or H', is indicated by means such as shown in Fig. 1 and illustrated more clearly in Fig. 2. Each roller, H or H', is mounted loosely on an arbor, I, each end portion of which is reduced to form a shoulder, i, and a stud, i'. The studs at the respective ends of arbor, I, fit in slots or notches, j, provided in flanges, j', extending at right angles to a plate, J, forming a part of each frame member, A', A². Attached rigidly to each arbor, I, are screw threaded stems, K⁵, said stems being fixedly secured in any desired way to end portions of the arbor, said stems extending at right angles to the length of the arbor. Plate, J, of each frame member, A', A², is provided with openings, k, which receive adjusting nuts, L, L'. Each adjusting nut is provided with a groove, l, adapted to receive the edge of an opening, k, in plate, J, whereby the adjusting nut, L, is so connected to plate J, that the nut is free to turn or rotate with respect to the plate, while at the same time, the nut is precluded from becoming separated or detached from the plate by the edge of opening, $k$, fitting in the groove, $l$, all as clearly shown in Fig. 4. In the process of manufacture nut, L, is of less diameter at one end than at the other, and in assembling the nut with reference to the plate, J, the reduced end is inserted into the opening of the plate, after which the reduced end is upset in order to form a flange, whereby the nut is rotatably swiveled upon the plate by having an edge of the opening, $k$, fitting in the annular groove, $l$, of the nut. The nut is provided with a female threaded opening, the threads of which engage with the male threads of stem, $K^5$, so that the nut, L, will coöperate with stem, $K^5$, for the purpose of adjusting arbor, I, and the roller mounted thereon. That part of each nut, L, L', which projects beyond the exposed face of plate, J, is provided with angular sides, as shown in Fig. 2, such as a hexagonal nut adapted to receive a wrench for the purpose of conveniently turning the said nut relative to the plate. With the nut coöperates means for indicating the adjusted position of the nut and the roller. As shown, a washer, M, is provided with an opening corresponding to the nut so that the washer will fit around the nut in a way to turn therewith. Each washer is provided with an indicating member, $m$, shown in Fig. 2 as a finger forming an integral part of the washer. The finger extends outwardly beyond the edge of the washer, and in one embodiment of the invention, said finger is represented as having a longitudinal slit, $m'$. The washer and the finger thereon are connected with the nut so as to rotate or turn therewith, and said washer and finger are positioned next to the plate, J, so that the washer and the finger will have frictional contact with said plate, the frictional contact of the finger with the plate operating to prevent the washer from turning out of the position into which it may be adjusted. The plate, J, forming a part of each member of the supporting frame, is provided with two indicating points, as at $o$, $o'$, one of said indicating points being inscribed with the phrase "To strop," and the other indicating point having another suitable phrase, such as "To hone." Intermediate the indicating points is a stop member, O, shown as a pin fixed to plate, J, and disposed in the path of finger, $m$, said pin operating to limit the rotation or adjustment of washer, M, and the nut, when said nut is turned in one direction or the other. The supporting frame, A, is shown as having a loop $p^2$, to which is connected an anchoring strap, $P^2$, the latter being adapted for engagement with a hook or other fixture, $P^3$, see Fig. 1. Strop, B, is shown as having suitable handles, $b'$, at its respective ends, whereby the operator is able to pull one lead or the other of said strop.

The operation of the machine shown in Figs. 1, 2 and 3, is as follows: With the indicating fingers, $m$, adjusted in contact with stop pins, O, as shown in Fig. 2, rollers, H, H', occupy positions for presenting the strop, B, at a certain angle to the blade in holder, C, whereby the machine is adapted for stropping the blade. In the machine shown, the frame members A', $A^2$ are adapted to be opened or spread so as to bring locking members K into contact with blade holder C, after which latch D is adjusted for one end thereof to contact with locking member K, whereby the frame members A', $A^2$ and the holder C are locked in fixed positions, said blade holder C being retained in a stationary position intermediate the frame members A', $A^2$, so that the operator is able to readily insert the blade into the holder. Latch, D, is now moved away from locking member, K', and the frame members, A', $A^2$, may then be closed toward each other, to assume the positions of Figs. 1 and 3. The operator now pulls on one lead of strop, B, the frictional engagement of which strop with the roller of blade holder, C, causes said blade holder to present the edge of the blade to one lead of the strop, substantially as shown in Fig. 3, whereupon the movement of the strop relative to the edge of the blade operates to sharpen said blade on one face thereof. By pulling upon the other lead of the strop, blade holder, C, is at once moved to present the other face of the blade into engagement with said other lead of the strop, and the continued movement of said other lead of the strop operates on the other face of the blade so as to sharpen the same. The operations of pulling first on one lead of the strop, and then on the other lead thereof, are continued so as to strop the blade to the desired extent, the rollers, H, H', presenting the respective leads of the strop at the proper stropping angle to the edge of the blade.

For the purpose of honing the edge of a dulled blade, it is necessary to so change the angle of the strop that it will operate more toward the edge of the blade, and this is accomplished in the machine shown in Figs. 1, 2, and 3 by adjusting rollers, H, H', outwardly or away from each other. Such adjustment is effected by applying a wrench to the nuts, L, L', so as to turn the nuts a quarter turn, or they may be turned a half turn, or a full turn, but as shown in Fig. 2, the stop pins, O, permit the nuts to be turned practically a full turn. When the nuts, L, L' are turned a full turn, washers, M, move therewith and the fingers, $m$, are turned past the indicating point, $o'$, around to and beyond the indicating point, o, so as to engage with the other side of the stop pins, the fingers being thus moved from the stropping position to the honing position. Obviously, the rotation of the nuts will adjust threaded stems, K, and arbors, I, so as to move rollers, H, H', upon the members, A', A², of the frame, said rollers being moved outwardly and away from each other and away from the edge of the blade in holder, C. The employment of the fingers, m, on the washers, M, which are adjustable with the nuts, L, L', indicates to the user the position of the rollers, H, H'. Now when the rollers, H, H', are adjusted in the manner described, the angle of presentation of the leads of the strop to the faces of the blade is so changed that the strop will operate upon the respective faces of the blade more toward the edge of said blade, and as the rollers are moved outwardly from the blade and the holder, it follows that an increased angle of contact is secured between said blade edge and the strop. Now, when the leads of the strop are pulled first in one direction and then in the other, said strop acts upon the edge of the blade with an increased sharpening effect, and by continuing the operation a sufficient length of time, the blade's edge will be thoroughly and effectively honed. After the honing shall have been completed, the operator may again apply the wrench to the adjusting nuts for the purpose of restoring the rollers, H, H', to the stropping positions, which positions will be indicated by the engagement of the indicating fingers, m, with the studs, O, and the operator may then resume the operation of stropping the blade until the desired keen edge is secured.

Figure 6:
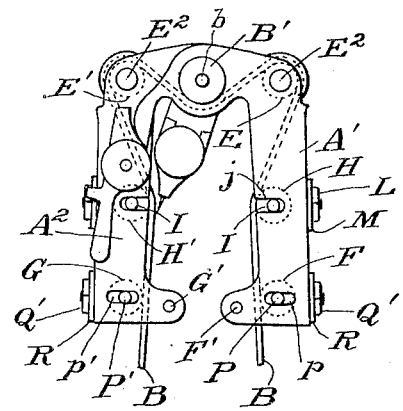

Figs. 5 and 6 of the drawings show a machine similar in many respects to the structure of Figs. 1 to 4, inclusive, with this exception. Whereas the guides, F, G, of Fig. 3 are mounted in frame members, A', A², so as to be non-adjustable therein, the corresponding guides, F, G, in Figs. 5 and 6 are supported for adjustment relative to the frame as well as, or in addition to, guides, H, H'. As shown, frame members, A', A², are provided with the desired slots, j, for the arbors, I, of adjustable rollers, H, H', which arbors are provided with stems, K, adapted to coöperate with nuts, L, and indicating members, M. In addition to these parts, provision is made for adjusting guides, F, G, and for indicating their positions. Accordingly, frame members, A', A², are provided with slots, p, p', which are parallel to slots, j, and in said slots are fitted the end portions of arbors, P, P', which carry the rollers, F, G, respectively. As shown in the construction of Fig. 5 arbors, P, P', are provided with stems Q, which should be threaded, and on which stems are screwed the adjusting nuts, Q', swiveled or rotatably connected to frame members, A', A². Coöperating with these nuts are the indicating members, R, each having a finger, r, and fixed to the frame members are stop pins, r', adapted to limit the rotation of the indicating members and the adjusting nuts. It is evident that rollers, F, G, may be adjusted in the frame as well as rollers, H, H', and that the positions of said rollers, F, G, are indicated by the fingers of members, R. Provision is made, furthermore, for the adjustment of rollers, E, E', relative to the strop-operated member, B', employed for imparting movement to the blade holder, whereby the frictional engagement of the strop with said member, B', may be regulated as desired. The frame is shown in Figs. 7 and 8 as having slots, s, s', extending outwardly and radially with respect to said member, B', and in these slots are fitted the end portions of arbors, E², which carry the rollers, E, E', respectively. Said arbors are associated with adjusting and indicating devices of the kind shown in Fig. 4, and accordingly, the arbors are provided with stems, S, upon which are screwed adjusting nuts, S', rotatably connected to frame members, A', A². Indicating members, T, are connected to the nuts for rotation therewith, each member, T, having a finger, t, adapted to engage with a stop pin, t', see Fig. 7. In lieu of slots, s, s', extending radially to the member, B', as just described, the frame may have slots, u, u', shown in Fig. 9, said slots being parallel to the sides of the frame. It will be understood that the arbors, E², in the construction of Figs. 7 and 8 may be adjusted inwardly toward, or outwardly from, member, B', for so positioning rollers, E, E' relative to member, B', that the area of contact between strop, B, and member, B', may be varied; and, further, the adjustment or positions of the rollers will be displayed by the positions of the indicating devices relative to the stop pins. A similar variation in the position of the strop relative to the member, B', is secured by the adjustment of rollers, E, E', in the slots, u, u', of the structure shown in Fig. 9.

Although I have shown and described rollers, E, E', as having flanges, it will be understood that each of the other rollers may be provided with similar flanges for precluding contact of the strop with the frame, and thus obviating wear on the edges of the strop.

Figs. 10, 11 and 12 illustrate the means for retaining the blade holder, C, midway between the leads of the running strop, B. This part of the invention comprises a member, D⁵, operated by the movement of the strop for rocking said blade holder, C, means for retaining the blade holder in a position intermediate the leads of the strop, and means for guiding or directing the leads of the strop. The members, A', A², are connected pivotally to arms, $a^3$, of a back member, $a^2$, whereby the side members, A', A², may be spread or opened relatively to each other, but, when the device is in operation, said side members are closed inwardly toward each other, as shown in Figs. 11 and 12. Strop operated member, $D^5$, is positioned within frame, A, and it is pivotally supported therein preferably on the same pivots which connect the side members with the back member. Said member, $D^5$, is thus supported in the frame for rocking movement therein, and this member is operatively connected with the blade holder, whereby the latter will be rocked from side to side as the member, $D^5$, is rocked by pulling the strop in one direction or the other. Member, $D^5$, is shown as having a curved or convex face, $d$, but on the other side of said member the faces are inclined, as at $d'$, so as to produce a substantially flattened surface, $d^2$. Blade holder, C, is provided at its ends with lugs, $c^3$, which are fitted close to the arms, $a^3$, of the back member, $a^2$, whereby the blade holder, C, is adapted to be pivotally supported within the frame. The means for pivoting the blade holder shown in Figs. 10 and 12 is embodied in a rod $E^6$, the same being parallel to member $D^5$, and positioned between said member $D^5$ and the blade holder. The blade holder is provided with lugs, one of which is shown at $c^3$ in Fig. 10, but it will be understood that two of such lugs are employed, said two lugs being positioned near the respective ends of the blade holder. The end portions of rod $E^6$ pass through these lugs and are secured in the arms $a^3$ of the back member, $a^2$. The lugs, $c^3$, of the blade holder are provided at their upper ends with notches, $c'$, shown more clearly in the construction of Fig. 18, and in these notches are fitted pins, $c^2$, provided at the end portions of member, $D^5$. When the member is turned in one direction by pulling upon one lead of the strop, the pins, $c^2$, act on the notched lugs, $c^3$, for the purposes of swinging the blade holder in an opposite direction, but by pulling the other lead of the strop, the member, $D^5$, is turned in an opposite direction, and pins, $c^2$, act on the blade holder to reverse its position with relation to the strop, whereby the blade holder is swung from side to side by reciprocating the strop. $F^7$ designates a spring positioned rearwardly of the blade holder and coöperating with member, $D^5$, and blade holder, C, for the purpose of retaining the blade holder in a central position intermediate the leads of the strop. As shown, spring, $F^7$, is a bowed, curved, or leaf spring, and it is positioned between member, $D^5$, and blade holder, C. At its middle portion, spring, $F^7$, is provided with a slot, $f$, adapted for the reception of a slightly curved face $d^2$ of member $D^5$, or said member $D^5$ may have the face $d^2$ therein flattened instead of curved. Each end portion of leaf spring, $F^7$, is provided with a longitudinal slot which receives the pivotal rod, $E^6$. It is apparent that the end portions of the spring are fitted loosely upon the pivotal rod, whereas the slotted middle part of the spring receives the flattened face, $d^2$, of member, $D^5$. By providing the spring with slots, $f$, $f'$, and positioning it for engagement with member, $D^5$, and pin, $E^6$, the spring is securely retained in position between the member and the blade holder, and, furthermore, said spring is compactly positioned for coöperation with the blade holder, the spring lying wholly within the frame and practically concealed by the parts composing the sharpener, including the strop. The spring, $F^7$, acts upon blade holder, C, for the purpose of adjusting said blade holder to a central position between the leads of the strop. When the member, $D^5$, is turned in one direction by the pull on the strop, one inclined face, $d'$, of said member acts upon the middle part of the spring for the purpose of compressing it more or less, thus increasing tension thereon. The same action takes place when the member is turned in an opposite direction, for the reason that the other inclined face, $d'$, of the member acts on the other edge portion of the spring. When the tension is relaxed on the strop, spring, $F^7$, presses against the member, $D^5$, and blade holder, C, in such a manner that said member and the blade holder will be returned to the position shown in Fig. 12, and retained in such position so long as the operator does not pull upon strop, B. When a frame having adjustable sides is employed, such as a frame adapted to be opened and closed, I employ arms, K, K', on the side members, A', A², for the purpose of engaging with the blade holder when said members are separated or spread, whereby said arms, K, K', are adapted for locking the blade holder fixedly in position when the frame is opened. As shown in Fig. 11, the arm, K', is provided with a notch, $k^2$, and when the frame members, A', A², are closed toward each other, as in Fig. 11, the arms, K, K', are moved away from the blade holder, and the nose of the latch D engages with said notch, $k^2$, of the arm, K', thereby locking the side members A', A² of the frame in closed positions.

In the construction shown in Figs. 13, 14 and 15, I omit the pivotal rod, $E^6$, for connecting the blade holder, C, with the back member, $a^2$. One lug, $c^3$, of said blade holder is provided with gear teeth, $m^2$, and the two lugs, $c^3$, of the blade holder are pivoted on the arms, $a^3$, of the back member by short pins or rivets, $E^3$. The strop operated member, D⁶, is provided at one end portion with a gear segment, $m^3$, and said gear segment $m^3$ engages with the gear segment, $m^2$, of the blade holder, whereby the movement of member, D⁶, is communicated directly to said blade holder, C, as shown in Fig. 14. Intermediate its length the member D⁶ is provided with a flattened face, $d^2$, adapted for engagement with the slotted middle part of the spring, F⁷, in substantially the same manner as described in the construction shown in Fig. 12. The end portions of spring, F⁷, engage with the flat rear side of blade holder, C, and said spring operates upon the blade holder and the strop actuated member for the purpose of positioning the blade holder in a substantially central position intermediate the leads of the strop. As shown in Fig. 15, the side members, A′, A², of the frame are provided with inclined shoulders, $a^4$, at one or both ends for the purpose of engaging with edges of arms, $a^{30}$, of the back member, $a^2$, when said side members, A′, A², are adjusted to their opened positions, indicated in dotted lines in said Fig. 15. The inclined shoulders, $a^4$, thus serve the purpose of stops when in engagement with the arms of the back member, thus limiting the opening or spreading movement of the frame.

The construction of Figs. 13, 14 and 15 is quite similar to the construction of Figs. 10, 11 and 12, except for the employment of the intermeshing gear segments between blade holder, C, and strop actuated member, D⁶, the means for pivotally supporting the blade holder and the means for retaining spring, F⁷, in operative position intermediate the member and the blade holder.

The construction illustrated in Figs. 16, 17 and 18 embodies a frame all parts of which are rigid, thus differing materially from the three part frame of Figs. 10 to 15, inclusive, wherein the pivoted frame members A′, A² are adapted to be opened and closed. The frame consists of a back piece, $a^5$, and two side pieces, $a^6$, $a^7$, rigidly connected to each other, said parts composing the frame being preferably stamped from a single piece of metal. The sides, $a^6$, $a^7$, of the frame are cut away, as shown in Figs. 17 and 18, to produce slots or openings, $n$, and between said side portions is positioned the blade holder, C, and strop actuated member, D². The blade holder is shown as having the lug $c^3$ provided with a notch $c'$, and in said notch is fitted a pin $c^2$, whereby the member D² is adapted to impart movement to the blade holder. The blade holder is pivotally supported within the frame by rod, E, which is positioned intermediate the blade holder and the member. Spring, F⁷, is positioned, also, between the blade holder and member, D², so that it will act to retain said blade holder in a substantially central position intermediate the strop when no tension is applied to said strop. Said spring, F⁷, is slotted as in the construction of Figs. 10 to 12, inclusive, and it is retained in operative position by the means and in the manner heretofore described. Instead of employing six rollers, as in the constructions heretofore described, I construct the frame, A′, so that it will support four rollers, or equivalent guide pins, for strop, B. Guide pins, $o^2$, $o^3$, are positioned in the rear part of the frame, A, and at the respective sides of the member, D², said guide pins being provided with rollers, O⁴, O⁵, respectively. The end portions, $a^6$, $a^7$, of the frame are provided with inwardly extending lugs, $a^8$, in which are mounted adjusting screws, $p^5$, engaging with guide pins, $p^6$, the latter supporting guide rollers, P⁷, P⁸, respectively. The rollers, P⁷, P⁸, are positioned nearly opposite to the end portion of blade holder, C, for the purpose of deflecting the strop inwardly toward the sides of a blade adapted to be positioned within a blade holder. The strop is looped within the frame, its bight is spread by rollers, O⁴, O⁵, and the respective leads of the strop are inclined by rollers. P⁷, P⁸, inwardly toward the blade holder, whereby the strop is adapted to be presented at proper angles to the respective sides of a blade in holder, C. The device is adapted to be supported in any suitable way, and as shown herein, the back member, $a^5$, of the frame is provided with lugs, $a^9$, supporting a pin, $b^2$, to which is connected a hanger B¹⁰.

The stropping machine shown in Figs. 19, 20 and 21 of the drawings embodies the generic features of the invention as heretofore described. The frame is, preferably, of the same type as the frame, A, in Figs. 16, 17 and 18, said frame supporting four guide pins, O², O² and P², P³, similar to the rollers, O⁴, O⁵ and P⁷, P⁸, of Fig. 17. Blade holder, C, is provided with lugs, $c^5$, which are attached rigidly to strop operated member, D³, so that the blade will swing with the strop operated member. In the constructions heretofore described, the strop passes from one rear guide to the other and over a convex face of the strop operated member, but in the construction of Figs. 19, 20 and 21, the strop passes beneath the strop actuated member so as to engage with the under convex face thereof. The guide pins or rods, O², O², are supported directly in the end members of the frame, but the other guide pins, P², P³, are attached to stems whereby they may be adjusted substantially by the means previously disclosed. Instead of employing a spring positioned intermediate the blade holder and a strop actuated member, heretofore described, I employ a spring, F³, which is positioned rearwardly of member, D³. The strop actuated member, D³, is shown as having a flattened or curved face, $d^6$, and with this curved face engages a retaining stem, $Q^2$, which is actuated by spring, $F^3$. Said retaining stem is provided with a head, $q$, positioned for engagement with the flattened or curved face, $d^6$, of the strop actuated member $D^3$. Spring, $F^3$, is provided with a slot for stem, $Q^2$, to pass through it, and said spring is positioned for its ends to engage the back member, $a^5$, of the frame, the middle part of said spring, $F^3$, acting upon the head, $q$, of stem, $Q^2$. The back member, $a^5$, of the frame is shown as having lugs, $a^{12}$, adapted to support a pivotal pin, $b^2$, to which is pivoted a hanger, $B^2$. The hanger is shown as a plate having a tapering slot, $b^3$, and said hanger is provided with a lug, $b^4$, to which is pivoted the outer bent end of stem, $Q^2$, as shown. The hanger is adapted to be turned to a position parallel to the back plate, $a^5$, of frame, whereupon spring, $F^3$, presses stem, $Q^2$, in an inward direction so that the head, $q$, of the stem will engage the flattened face, $d^6$, of member, $D^3$, whereby the stem, $Q^2$, acts to retain member, $D^3$, and blade holder, C, in position, said blade holder being retained in a position substantially midway between the respective leads of strop, B. When it is desired to use the device, the operator pulls on the strop and adjusts the hanger $B^2$ to a position substantially at right angles to the frame, as shown in Figs. 20 and 21. This operation causes lugs, $b^4$, of the hanger to pull on stem, $Q^2$, against the tension of spring, $F^3$, and the stem, $Q^2$, is pulled from engagement with member, $D^3$, the spring being compressed, as shown in Fig. 20, and the member, $D^3$, being released from the action of the stem, whereby the strop, B, may be operated for imparting motion to member, $D^3$, which member swings the blade holder alternately in one direction and then in another direction.

The same general results and mode of operation described in connection with the construction of Figs. 19, 20 and 21 are adapted to be secured by another construction illustrated in Figs. 22 and 23 of the drawings. The stropping device shown in the two figures last mentioned embodies the same general features as the device of Figs. 19 and 21, inclusive, except that the means for retaining member, $D^3$, and blade holder, C, are modified in the following particulars: The flattened face, $d^6$, of member, $D^3$, is adapted to be engaged by the inner part, $r^3$, (Fig. 23) of yoke shaped retaining device, R'. The legs, $r^4$, of this retaining device are fitted slidably in openings, $r^2$, provided in the back plate of frame A. Through the yoke, R', passes spring, $F^4$, the ends of which bear upon the back plate of the frame, while the middle part of said spring acts against the cross piece, $r^3$, of the yoke shaped retaining and pressure device. The back plate of the frame is provided with outwardly extending lugs, $a^{13}$, in which lugs are provided slots, $a^{14}$. Hanger, $B^2$, is connected by a pin, $b^5$, with the lugs, $a^{13}$, of the frame, said pin passing through the slots, $a^{14}$, of the lugs, whereby yoke, R' is adapted to be moved relative to the strop actuated member, $D^3$, by the pull of hanger, $B^2$, on the pin, $b^5$, and upon the legs, $r^4$, of said yoke. The yoke is pressed into engagement with the flattened face of member, $D^3$, by the spring, $F^4$, but the yoke may be moved rearwardly in order to release the member when tension is applied to strop, B. The hanger of Figs. 22 and 23 has the tapering slot, $b^3$, described in the hanger of the construction shown in Figs. 18, 19 and 20. The tapering slot is advantageous when used in connection with a hook or other fixture because the edges of the slot are adapted to bind upon the hook or other fixture and limit the sway of the stropping machine with relation to said hook. In the drawings blade holder, C, is shown as having a spring, $S^2$, adapted to be adjusted into frictional engagement with the back of a razor blade by the operation of a screw, $S^3$, said spring and screw being positioned and operated as disclosed in my prior Patent No. 870,279.

It is evident that the novel features of my new machine may be used in conjunction with different kinds of stropping devices, and that various changes in the form, size, proportions and minor details of construction may be made without departing from the spirit of the invention as defined by the annexed claims.

The adjusting rollers previously described are also used to regulate the distance between the two sharpening faces of the strop on either side of the blade holder, C, whereby an even pressure will be applied along the edge of the razor blade. This is accomplished by turning the adjusting nuts in the direction indicated until the desired pressure between the razor blade and the sharpening faces of the strop is attained.

Having thus fully described the invention, what I claim as new, and desire to secure by Letters Patent is:

1. In a device of the class described, a supporting frame, a strop, a blade holder, strop guides positioned with reference to the holder so as to be approximately opposite to the edge of a blade adapted to be carried in said holder, means for adjusting said guides whereby the angle of the strop with reference to the blade may be changed, and means for indicating the positions of said strop guides.

2. In a device of the class described, a supporting frame, a strop, a blade holder operated by the movement of the strop, strop guides positioned on the frame, and coöperating screws and nuts operatively related to the strop guides for adjusting the same.

3. In a device of the class described, a supporting frame, a strop, a blade holder positioned within the frame and adapted to be operated by the movement of the strop, a plurality of strop guides on the frame, one of the strop guides in each series being positioned substantially opposite to the edge of a blade adapted to be held in the blade holder, means for adjusting each of the last mentioned strop guides toward and from the blade holder whereby the angle of the strop relative to the blade may be changed, and means for indicating said adjustment of the strop guides.

4. In a device of the class described, a supporting frame, a strop, a blade holder operated by the movement of the strop, strop guides supported on the frame, threaded stems connected one to each strop guide, adjusting nuts rotatably connected to the frame and engaging with said threaded stems, and means for indicating the adjustment of the nuts and the strop guides.

5. In a device of the class described, a supporting frame, a strop, a blade holder operated by the movement of the strop, strop guides positioned on the frame, adjusting means including rotatable nuts for changing the positions of the strop guides relative to the frame, and indicating means including a finger movable with said rotatable nuts.

6. In a device of the class described, a supporting frame, a strop, a blade holder operated by the movement of the strop strop guides on the frame, rotatable adjusting means operatively connected to said strop guides, and indicating members operated by the movement of said adjusting means.

7. In a device of the class described, a supporting frame, a strop, a blade holder operated by the movement of the strop, strop guides positioned on the frame, rotatable adjusting means operatively connected to said strop guides, an indicating member operated by the movement of said adjusting means, and means for limiting the movement of said indicating member.

8. In a device of the class described, a supporting frame, a strop, a blade holder operated by the movement of the strop, strop guides positioned on the frame, rotatable adjusting nuts operatively connected with said strop guides, a washer movable with each nut, said washer having an indicating finger, and means for limiting the movement of said nuts and the indicating means.

9. In a device of the class described, a frame, a strop, a blade holder movable relative to the frame, adjustable means for changing the angular relation of the strop relative to a blade adapted to be carried in the holder, whereby a blade may be either honed or stropped, and indicating means coöperating with said adjusting means.

10. In a device of the class described, a frame, a strop, a blade holder movable relative to the frame, means connected adjustably to the frame for varying the angle of inclination of the strop relative to a blade adapted to be carried in said holder, whereby a blade may be honed by the strop when occupying one position or it may be stropped when in a different position, and indicating means coöperating with said adjusting means.

11. In a device of the class described, a frame, a strop, a blade holder movable relative to the frame, strop guides positioned on the frame, means for adjusting one or more of said strop guides, and coöperating fingers and pins for indicating the adjusted positions of said guide.

12. In a device of the class described, a frame provided with slots, a plurality of strop guiding pins fitted in said slots, threaded stems secured to each of said strop guiding pins, a rotatable nut on each stem, a strop coöperating with said strop guiding pins, and a blade holder operated by the strop.

13. In a device of the class described, a frame having slots, a pin fitted in said slots, threaded stems secured to the pin, a rotatable nut on each stem, a strop coöperating with the pin, a blade holder operated by the strop, and means operated by the rotation of the nut for indicating the adjusted positions of the pin.

14. In a device of the class described, a frame, a doubled strop, a strop-actuated member having a cut away portion, a blade holder operated by the strop actuated member, a pressure member slidable in the frame and positioned for coöperation with the cut away portion of the strop-actuated member, and a spring acting to retain the pressure member in engagement with the strop-actuated member.

15. In a device of the class described, a frame, a strop, a strop-actuated member, a blade holder operated by the strop-actuated member, a movable pressure member positioned for engagement directly with the strop-actuated member and acting to position the blade holder centrally between the leads of the strop, and means for operating and adjusting the pressure member.

16. In a device of the class described, a frame, a strop, a strop-actuated member, a blade holder operated by the strop-actuated member, a movable pressure member positioned for engagement directly with the strop-actuated member, a spring rearwardly of the blade holder and acting upon the pressure member, and means for operating and adjusting the pressure member.

17. In a device of the class described, a frame, a strop, a strop-actuated member having a bearing face, a blade holder operated by said strop-actuated member, a pressure member movable relative to the frame, said pressure member coöperating directly with the bearing face of said strop-actuated member, and a spring acting against the pressure member.

18. In a device of the class described, a frame, a strop, a member operated by the strop, said member having a bearing face, a blade holder operated by the member, a pressure member positioned for coöperation directly with the bearing face of the first member, and a spring for retaining the pressure member normally in contact with the bearing face on said first member.

In testimony whereof I have signed my name to this specification in the presence of two subscribing witnesses.

LEON A. FLINKER.

Witnesses:
    AUSTIN L. RICHARDSON,
    JAS. A. ELLIS.

---

Copies of this patent may be obtained for five cents each, by addressing the "Commissioner of Patents, Washington, D. C."